H. D. HIBBARD.
REACTION APPARATUS.
APPLICATION FILED APR. 7, 1908.
1,047,052.
Patented Dec. 10, 1912.
3 SHEETS—SHEET 1.
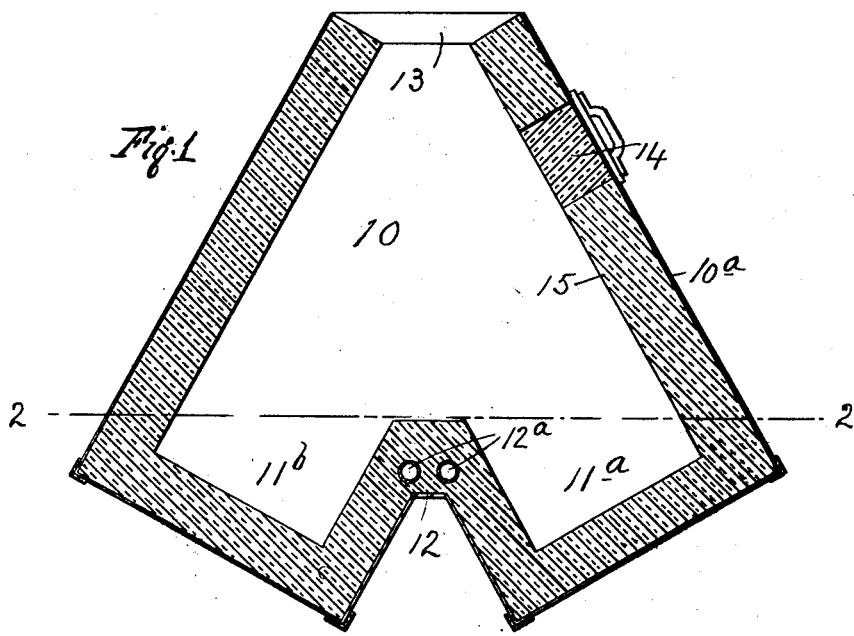
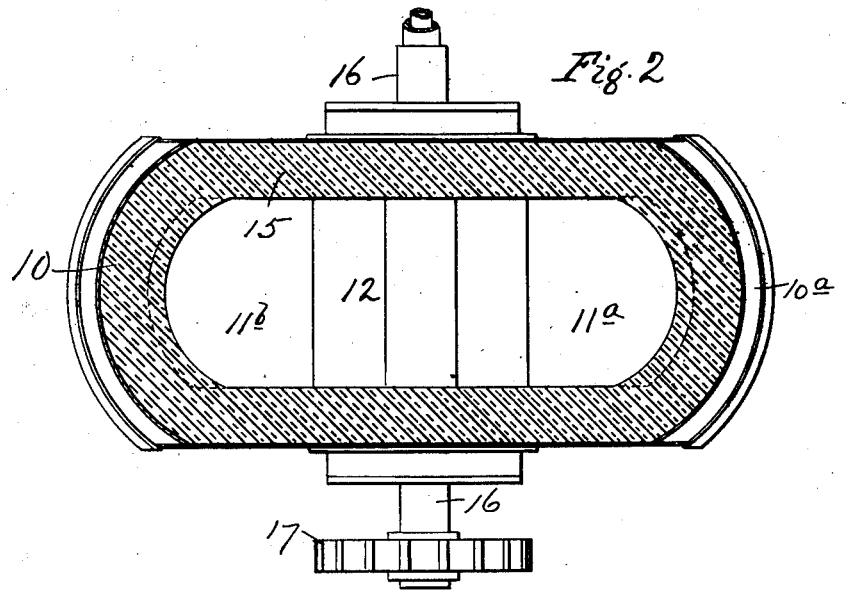
WITNESSES
L. H. Grote
Waller Abbe
INVENTOR
Henry D. Hibbard
BY
Horsman & Horsman
ATTORNEYS

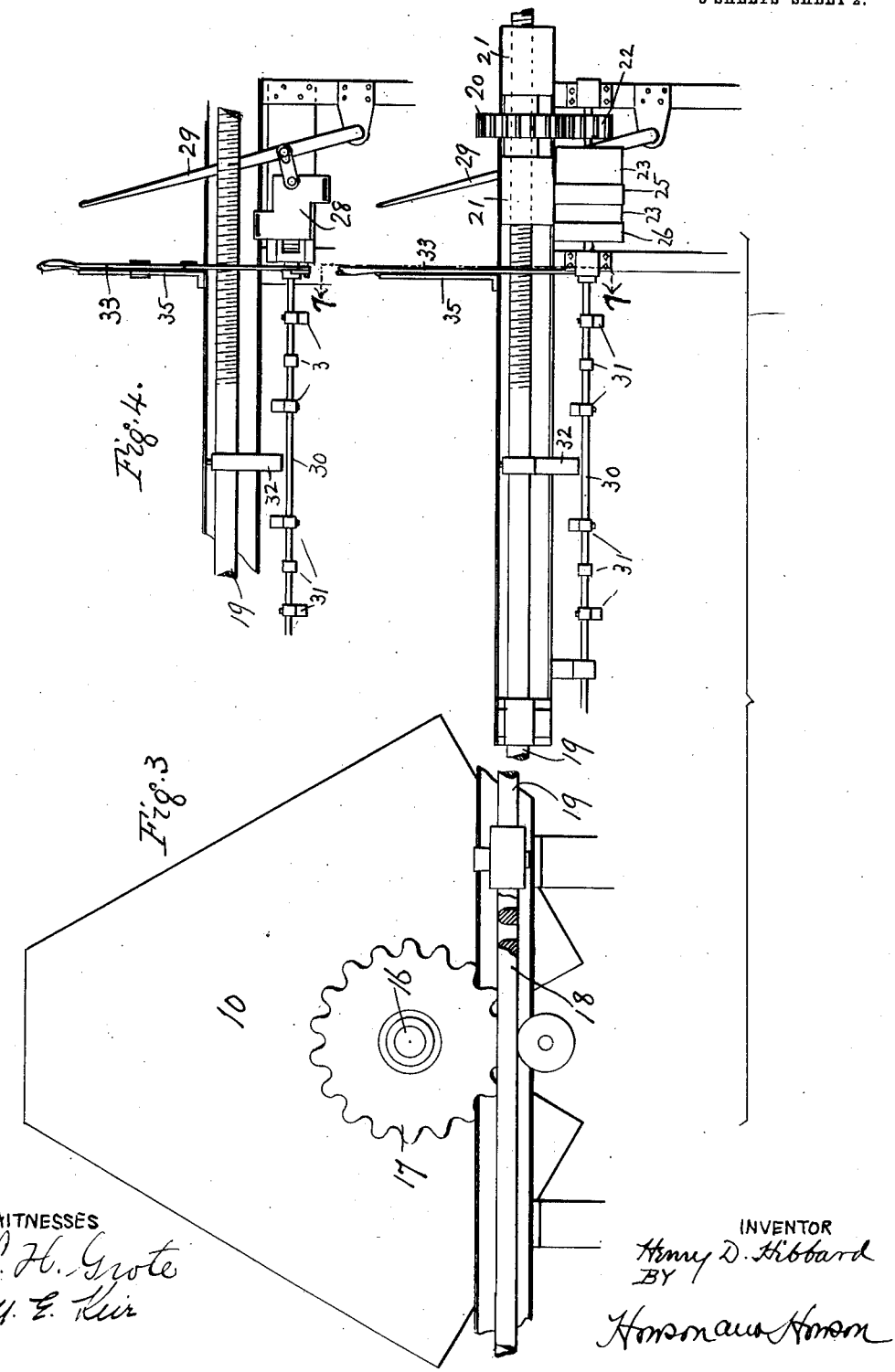

H. D. HIBBARD.
REACTION APPARATUS.
APPLICATION FILED APR. 7, 1908.
1,047,052.
Patented Dec. 10, 1912.
3 SHEETS—SHEET 3.
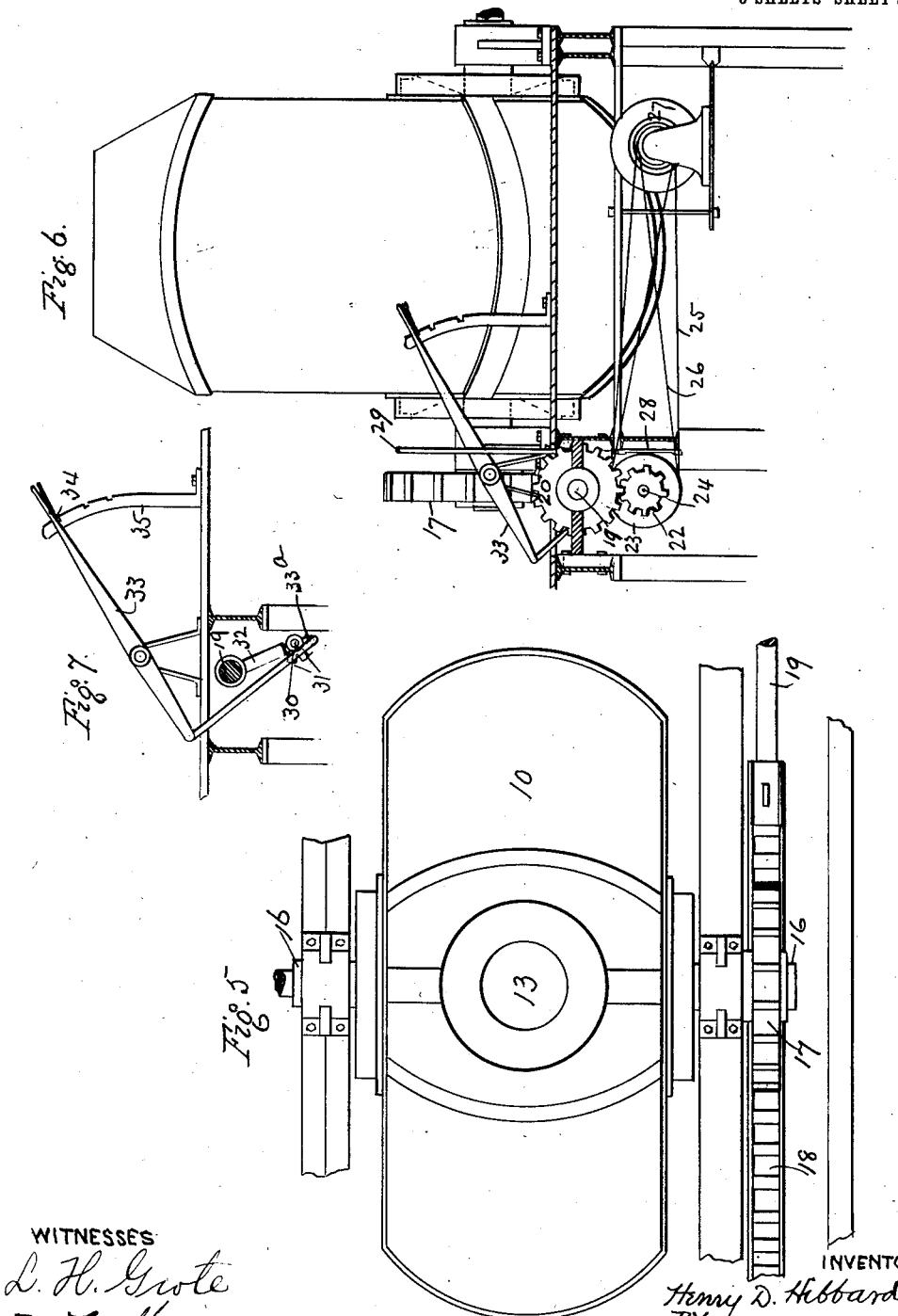
WITNESSES
L. H. Grote
M. E. Kerr
INVENTOR
Henry D. Hibbard
BY
Howson and Howson
ATTORNEYS

UNITED STATES PATENT OFFICE.

HENRY D. HIBBARD, OF PLAINFIELD, NEW JERSEY.

REACTION APPARATUS.

1,047,052.     Specification of Letters Patent.     Patented Dec. 10, 1912.

Application filed April 7, 1908. Serial No. 425,637.

*To all whom it may concern:*

Be it known that I, HENRY D. HIBBARD, a citizen of the United States of America, residing in Plainfield, in the county of Union and State of New Jersey, have invented certain new and useful Improvements in Reaction Apparatus, of which the following is a specification.

My invention relates to reaction apparatus and especially to a reaction vessel and its operative connections adapted to facilitate chemical reactions between fused reagents of different specific gravity.

The particular object of my invention is to provide a reaction apparatus adapted for the carrying out of the process described in my application Serial No. 251,677, filed March 23, 1905, for the utilization of the calorific power of the metalloids in crude iron, in the reduction of iron from the oxid to the metallic state.

In the accompanying drawings in which an apparatus embodying my invention is shown, Figure 1 is a sectional elevation of a reaction vessel embodying my invention; Fig. 2 is a horizontal section thereof on the line 2—2, Fig. 1; Fig. 3 is a broken side view thereof mounted in connection with means for rocking said vessel; Fig. 4 is a broken side elevation of portion of said rocking apparatus; Fig. 5 is a plan view of the vessel; Fig. 6 is an end elevation of the apparatus partially broken away; and Fig. 7 is a similar elevation on the line 7—7, Fig. 3.

In metallurgical processes it is at times necessary or desirable to secure a chemical reaction between reagents which by reason of their different specific gravities, constantly tend to separate into distinct strata and thus present an obstacle to the thorough mixture which is necessary for the purpose of the reaction. I have found that this reaction may be accomplished very satisfactorily however by pouring the reagents through each other repeatedly, whereby the reagent of less specific gravity is not only carried down through the reagent of greater specific gravity but tends from its nature to work up through the latter, and vice versa. This is a very efficient means for carrying out the process described in my above mentioned application, comprising a reaction between molten crude iron and molten oxid of iron, either pure or mixed with silicate of iron. In the accompanying drawings I have shown a suitable apparatus embodying my invention and particularly adapted for the carrying out in this manner of a reaction between fused reagents. By a fused reagent is to be understood a substance which becomes fluid at a temperature above atmospheric temperature and while the apparatus is particularly suited to a reaction between reagents both of which are fused, it will be understood that under certain conditions the reaction may be accomplished in apparatus embodying my invention between reagents only one of which is fused.

I have shown a single vessel 10 provided with two containing pockets $11^a$ and $11^b$, separated from each other by a dam 12 with slanting sides which facilitate the pouring of the contents of one pocket thereover into the other pocket. A fill aperture 13 at the top of the receptacle is provided for the charging and discharging of the vessel. This may be supplemented by an aperture on one side, closed by a removable plug 14 which permits ready access to the interior for adding ingredients during the operation of the apparatus or for other purposes. The side walls of the vessel may be extended upwardly and inwardly but in any case it should be a substantially closed vessel designed to preserve the heat of the interior and to prevent the access of air to the charge as much as possible. To protect the outer shell $10^a$ from the effect of acids or other injurious chemicals as well as to provide an additional means for preserving the heat of the interior, a refractory lining 15 of any suitable structure may be provided. In order to keep the dam 12 as cool as possible, I prefer to recess it from beneath, thus making it in effect hollow. Supplementing this I also pass through the dam, conduits $12^a$ by means of which air or any other cooling fluid may be passed through the interior of the dam. This vessel I mount in any suitable manner and provide any suitable means for moving the same so as to secure the desired intermixture. This is perhaps best accomplished by oscillating the same first in one direction and then in the other so that the charge contained therein is poured over the dam from one pocket to the other, either partially or wholly and as rapidly as may be desired. To this end I have shown the vessel carried by lateral trunnions 16, mounted on a suitable supporting structure. One of the trunnions 16 is provided with a ratchet wheel 17, which engages a movable rack 18, actuated by a rod 19. The latter is provided at one end with a thread which is engaged by an internally threaded nut 20, rotating between the stationary bearings 21. This nut in turn is driven by a gear wheel 22, on the spindle 24, which is rotated by pulleys 23. Bands 25 and 26 (the latter crossed to secure the reverse) connect said pulleys with the motor 27. A belt shifter 28 is provided which may be operated manually by means of a lever 29, or automatically by means of a tappet rod 30, against the tappets 31 on which a finger 32, carried by the spindle 19, impinges as the latter travels back and forth. It will be noted that the pairs of tappets 31 are angled about the tappet rod so that any pair thereof may be brought into the line of travel of the finger 32 by rotating the tappet rod. This may be readily done by means of a lever 33 working through a link 33ª mounted on a lever on said rod. A catch 34 acting in combination with a notched segment 35, is provided for the lever 33 to secure it in the positions required for the operation of the various tappets. It will be readily seen that by this arrangement I not only secure the automatic rocking of the vessel 10, but provide means for varying the extent of the rocking motion during the operation of the apparatus by shifting the tappet rod to bring the different pairs of tappets into action, without interrupting the movement of the actuating rod 19. This may be further supplemented by making the tappets adjustable upon the rod 30, and by providing a nest of pulleys for the motor whereby the speed of the driving belts may be varied.

It will be readily understood that the details of the construction above described may be varied in adapting the apparatus for other or similar uses, without departing from my invention and I do not limit myself to the exact construction shown.

Where in any of the following claims I use the term "substantially closed" vessel, I mean one which is constructed without blast or other air admission openings and so as to substantially protect the charge from the access of air introduced as a blast or to burn fuel or otherwise.

I claim as my invention:

1. A reaction apparatus for the purpose described, comprising a substantially closed movable reaction vessel adapted to contain a charge comprising two or more reagents, automatically controlled means for actuating the same so as to mix said reagents and means for varying the extent of the motion of said vessel.

2. A reaction apparatus for the purpose described, comprising a movable reaction vessel adapted to contain a charge comprising two or more reagents, automatically controlled means for actuating the same so as to mix said reagents, and adjustable means for varying the extent of the motion of said vessel.

3. A reaction apparatus for the purpose described, comprising a movable reaction vessel adapted to contain a charge comprising two or more reagents, automatically controlled means for actuating the same so as to mix said reagents, and adjustable means for varying the extent of the motion of said vessel without interrupting the operation of the apparatus.

4. A reaction apparatus for the purpose described, comprising a substantially closed movable reaction vessel adapted to contain a charge comprising two or more reagents, means for actuating the same so as to mix said reagents, automatic means for reversing the motion of said vessel and means for regulating the extent of said motion.

5. A reaction apparatus for the purpose described, comprising a substantially closed movable reaction vessel adapted to contain a charge comprising two or more reagents, automatically controlled means for actuating the same continuously so as to mix said reagents, and means for varying the speed at which said vessel is actuated without interrupting the operation of the apparatus.

6. A reaction apparatus for the purpose described, comprising a substantially closed movable reaction vessel adapted to contain a charge comprising two or more reagents, automatically controlled means for actuating the same continuously so as to pass said reagents through one another repeatedly, and means for varying the extent of motion and speed at which said vessel is actuated without interrupting the operation of said apparatus.

7. A reaction apparatus for the purpose described, comprising a movable reaction vessel having a plurality of pockets to hold the charge, and automatic means for rocking said vessel so as to pour the charge from one pocket to another and back again repeatedly, and means to vary the extent of the rocking motion without interrupting the operation of the apparatus.

8. A reaction apparatus for the purpose described, comprising a movable reaction vessel having a plurality of pockets to hold the charge, and automatic means for rocking said vessel so as to pour the charge from one pocket to another and back again repeatedly, and means for varying the speed at which the vessel is rocked.

9. A reaction apparatus for the purpose described, comprising a movable reaction vessel having a plurality of pockets to hold the charge, and automatic means for rocking said vessel so as to pour the charge from one pocket to another and back again repeatedly, and means for varying the extent to and speed at which the vessel is rocked.

10. A reaction apparatus for the purpose described, having a movable reaction vessel lined with a refractory material and adapted to contain the charge comprising two or more reagents and automatically controlled means for actuating the same so as to pass said reagents through one another repeatedly, and means for varying the extent of the motion of said vessel without interrupting the operation of the apparatus.

11. A reaction apparatus for the purpose described, comprising a movable reaction vessel having a plurality of pockets, each of which is large enough to hold substantially all of the charge, and means for actuating the vessel so as to pour the charge from one pocket to the other and back again repeatedly, and means for varying the extent of the motion of said vessel without interrupting the operation of the apparatus.

12. A reaction apparatus for the purpose described, comprising a movable reaction vessel, a dam therein separating the same into a plurality of containing pockets, each of which is large enough to hold substantially all of the charge, and means for actuating the vessel so as to pour the charge from one pocket to the other and back again repeatedly, and means for varying the extent of the motion of said vessel without interrupting the operation of the apparatus.

13. A reaction apparatus for the purpose described, comprising a substantially closed movable reaction vessel, and a hollow dam therein separating the same into a plurality of containing pockets each of which is large enough to hold substantially all of the charge and means to rock said vessel continuously so as to pass the charge over said dam repeatedly and thereby intimately mix the ingredients thereof, as and for the purpose specified.

14. A reaction apparatus for the purpose described, comprising a substantially closed movable reaction vessel, a dam separating the same into a plurality of pockets, and means for cooling said dam and means to rock said vessel continuously so as to pass the charge over said dam repeatedly and thereby intimately mix the ingredients thereof, as and for the purpose specified.

15. A reaction apparatus for the purpose described, comprising a movable reaction vessel, a dam arranged on the bottom thereof and separating the same into a plurality of containing pockets, each of which is large enough to hold substantially all of the charge, cooling pipes passing therethrough, and means for supplying a cooling fluid to said pipes.

16. A reaction apparatus for the purpose described, comprising a movable substantially closed reaction vessel adapted to contain the charge comprising two or more reagents, automatically controlled means for actuating the same so as to pass said reagents through one another repeatedly, and means for varying the extent of the motion of said vessel.

17. A reaction apparatus for the purpose described, comprising a substantially closed movable vessel provided with a charging aperture and a supplementary normally closed aperture suitable for the addition of reagents, said vessels being adapted to contain a charge comprising two or more reagents, and automatically controlled means for actuating the same so as to mix said reagents.

18. A reaction apparatus for the purpose described, having a substantially closed movable vessel provided with a plurality of containers for the ingredients to be mixed and means for rocking said containers so as to pour the ingredients from one into the other and back again alternately, substantially as described.

In testimony whereof I have signed my name to this specification, in the presence of two subscribing witnesses.

HENRY D. HIBBARD.

Witnesses:
WILLIAM ABBE,
L. H. GROTE.